Feb. 2, 1965  C. MARKS  3,168,660
THREE PHASE PIEZOELECTRIC GENERATOR
Filed March 14, 1962  2 Sheets-Sheet 1
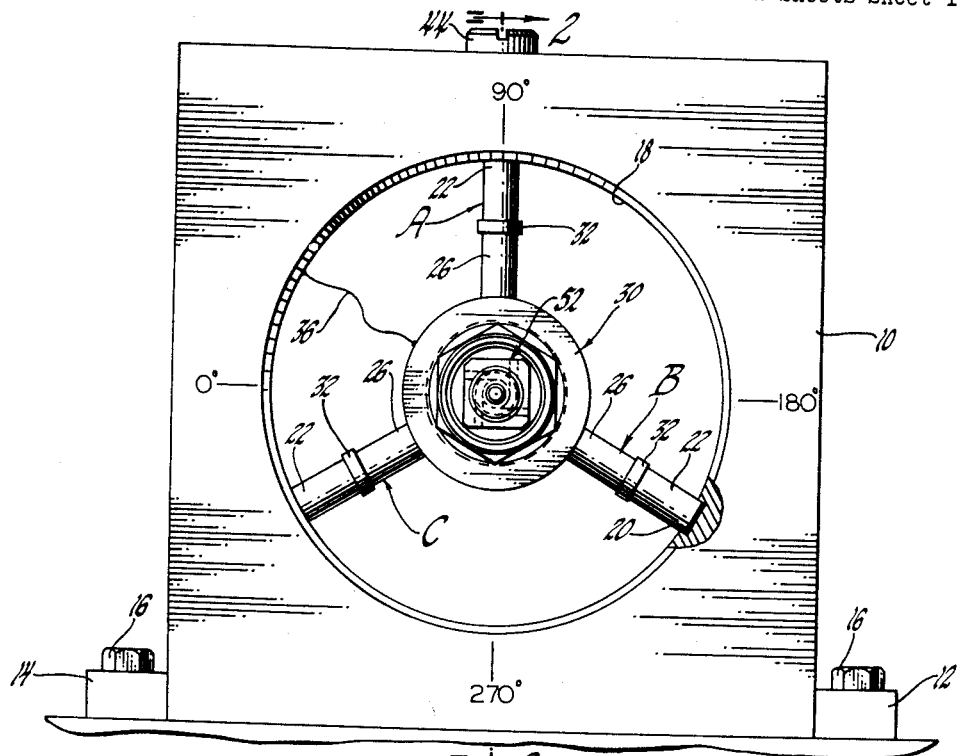
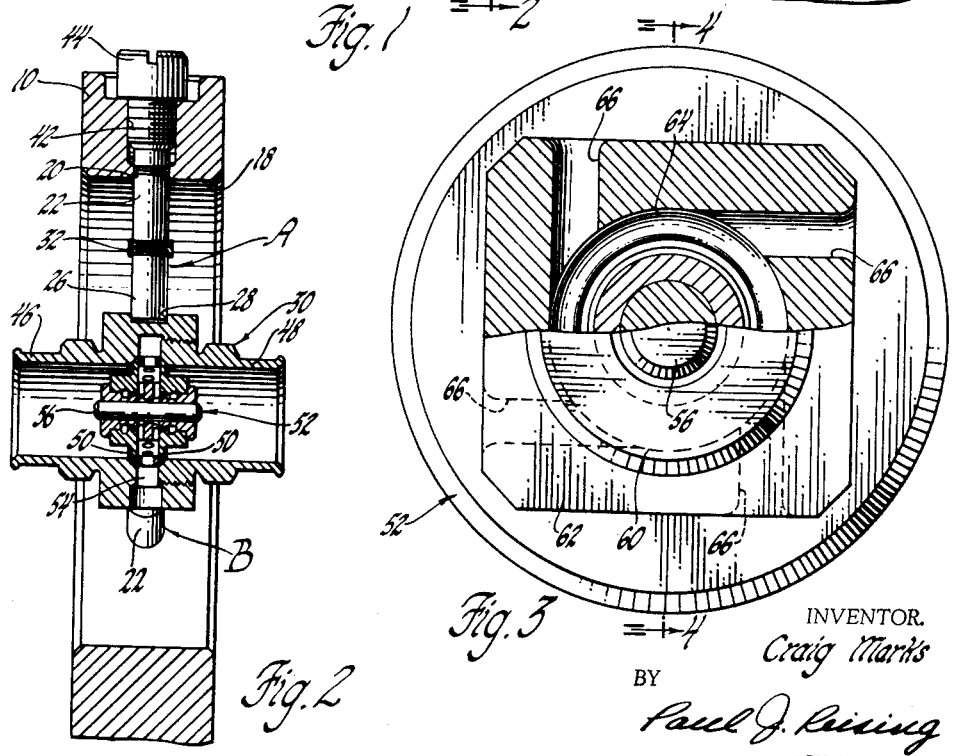
INVENTOR.
Craig Marks
BY
Paul J. Rising
ATTORNEY Feb. 2, 1965 C. MARKS 3,168,660
THREE PHASE PIEZOELECTRIC GENERATOR
Filed March 14, 1962 2 Sheets-Sheet 2

INVENTOR.
Craig Marks
BY
Paul J. Reising
ATTORNEY

—

3,168,660
THREE PHASE PIEZOELECTRIC GENERATOR
Craig Marks, Grosse Pointe Woods, Mich., assignor to General Motors Corporation, Detroit, Mich., a corporation of Delaware
Filed Mar. 14, 1962, Ser. No. 179,687
7 Claims. (Cl. 310—8.7)

This invention relates to an electric generator and more particularly to an improved method and apparatus for transforming mechanical energy into electrical energy by means of piezoelectric crystals.

It is well known that certain crystalline materials such as quartz, Rochelle salts and ceramic barium titanate, commonly referred to as piezoelectric crystals, are capable of producing an electric voltage when subjected to a change in stress such as that created by a compressive force. In the past, various attempts have been made to utilize this phenomenon in an electric generator, the compressive force in such previous devices being supplied either by an electrical oscillator or by a shaft driven eccentric. However, both of those crystal distorting means have serious limitations; the electrical oscillator because of the limited amount of compressive force generated and the shaft driven eccentric because of the difficulty of attaining operation at a high frequency. Since the electrical output of such an electric generator increases in proportion to both the frequency and the strength of the compressive force applied, none of the existing devices accomplishes the optimum electrical output which such crystals are capable of producing.

It is among the objects of the present invention to provide an electrical power generating apparatus and method in which a high frequency mechanical force applier creates a rotating force vector that sequentially compresses a plurality of preloaded piezoelectric elements to generate a polyphase voltage; to provide such an apparatus and method in which the mechanical force applier automatically maintains a constant speed; to provide such an apparatus and method in which the piezoelectric elements are preloaded and coupled with a force applier in a manner that alternately causes a varying periodic compression and removal of the preload in the elements to generate an alternating voltage.

The above and other objects are accomplished with a generator comprising a force applier having a fluid driven eccentric mass that orbits within a confining chamber so as to create a rotating force vector. The force applier is coupled to a plurality of preloaded piezoelectric elements that extend radially from a stator and are circumferentially spaced at equal points around the outer housing of the force applier to permit the rotating force vector to sequentially compress and unload the crystals for generating an alternating polyphase voltage. The housing of the force applier and piezoelectric elements serve as a mass spring vibration system which resonates at its natural frequency when driven by the unbalanced force of the orbiting mass. The piezoelectric elements are arranged to serve as a spring with the housing as the mass and by driving the mass at a frequency approaching the resonant frequency of the system, the mass is constrained to one speed, and through the piezoelectric crystals automatically generates a constant high frequency voltage.

A more complete understanding of the invention may be derived from the detailed description which follows taken in conujnction with the accompanying drawings, in which:

FIGURE 1 is an elevation view of the piezoelectric generator;

FIGURE 2 is a sectional view taken on lines 2—2 of FIGURE 1;

FIGURE 3 is an enlarged, partly sectioned end view of the force applier incorporated with the piezoelectric generator of FIGURE 1;

Figure 6:
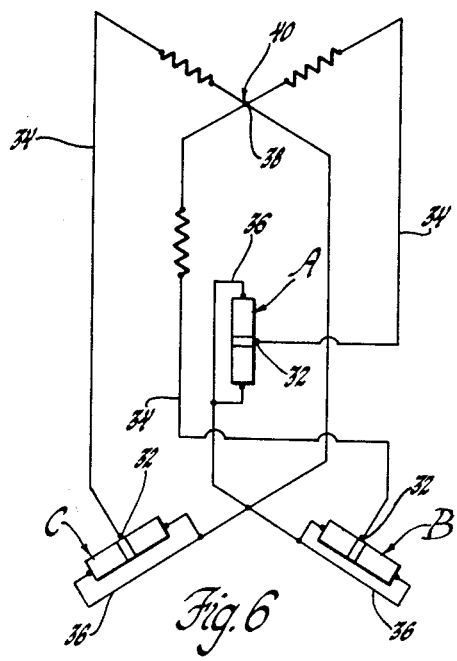
FIGURE 6 is a view showing an illustrative electrical circuit for the generator of FIGURES 1 and 2.

Referring now to the drawings, FIGURE 1 shows a piezoelectric generator comprising a generally square housing or stator 10 having a pair of laterally extending flange members 12 and 14 that fixedly secure the housing to a base by appropriate fasteners such as the bolts 16. The inner surface 18 of the housing is cylindrical and has three small recesses 20 formed therein at angularly spaced points of 120° each for supporting one end 22 of a pair of aligned piezoelectric elements of which there are three sets identified as A, B, and C. Each set of elements extends radially inwardly from the housing with its inner end 26 mounted in a dead-end bore 28 located in a force applier or crystal distorter 30. This arrangement permits each set of piezoelectric elements to serve as a spring support for the force applier 30 while being connected mechanically in series but, as shown in FIGURE 6, electrically in parallel with the like poles of the piezoelectric elements being back to back and connected by a high voltage terminal 32. The terminal 32 electrically connects the two piezoelectric elements of each set together and serves as a power take-off for directing current to each of the lines 34. A neutral connection 36 joins the ground poles of the elements, through the housing 10 and the force applier 30, and forms a Y connected generator circuit. This is connected to the neutral 38 of the Y connected load generally indicated at 40. As best seen in FIGURE 2, a threaded counterbore 42 is formed in vertical alignment with set A to accommodate a preload screw 44 which engages the end of the set for purposes which will hereinafter be explained.

The force applier 30 includes tubular portions 46 and 48 both of which are threadably interconnected and have beveled annular inner surfaces 50 for supporting a turbine assembly 52. An annular passage 54 is formed by the tubular portions and connects with radially extending ports (not shown) formed in the portion 46 so as to provide openings to atmosphere for exhausting the pressurized fluid that serves to drive the force applier.

Figure 4:
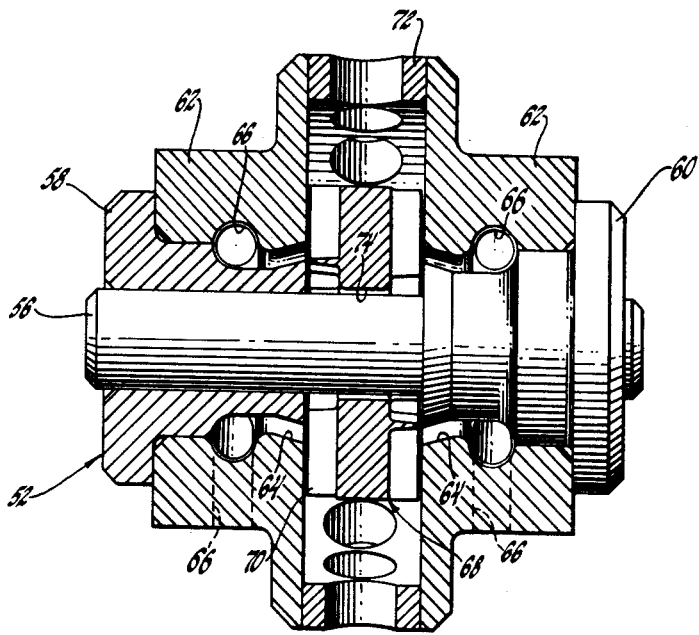
FIGURE 4 is a sectional view taken on lines 4—4 of FIGURE 3.
Figure 5:
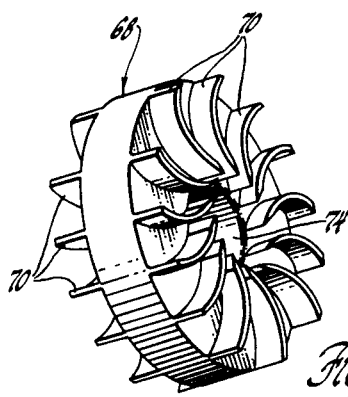
FIGURE 5 is an isometric view of the turbine wheel incorporated with the force applier of FIGURES 3 and 4.

Referring now to FIGURES 3 and 4, the turbine assembly 52 comprises a shaft 56 which is supported at its respective ends by press-fitted plugs 58 and 60. Each plug supports a sleeve member 62 that together with the plug forms an annular nozzle 64 that connects with fluid passages 66 formed in the sleeve members. As best seen in FIGURE 3, the passages 66 are offset with respect to the shaft 56 and are adapted to provide a fluid flow in a tangential direction to the nozzles, which in turn, direct a stream of high velocity fluid at a desired entrance angle against a ring type mass or turbine wheel 68. As best seen in FIGURE 5, the turbine wheel 68 includes a plurality of vanes 70 circumferentially formed on each side of the wheel and has an aperture 74 through which the shaft 56 passes for rotatably supporting the wheel. An apertured ring member 72 is rigidly connected to the sleeve member 62 and serves to exhaust the pressurized fluid being supplied to the turbine assembly via the passages 66.

During operation of the generator, air or other fluid under pressure is axially directed into both openings formed in the portions 46 and 48 towards the turbine assembly 52. The fluid enters the turbine assembly through the offset passages 66 wherefrom the fluid is then directed as a high velocity stream by each nozzle 64 against the vanes 70 formed on the turbine wheel 68. The inner diameter of the wheel aperture 74 is larger than the outer shaft diameter, consequently, as the wheel 68 is driven by the fluid stream, it follows a hula-hoop or orbital path about the shaft 56. Hence a centrifugal force in the form of a rotating force vector acts against the shaft with the result that this rotating force is applied to the tubular housing 46; 48 through the beveled surface 50. The magnitude of the centrifugal force is determined by the mass or the wheel and the eccentricity and frequency of the orbit.

As mentioned above, the turbine wheel is driven about the pin in a hula-hoop manner, and therefore, the orbital movement of the turbine wheel on the pin occurs at a higher frequency than the rotational frequency of the turbine 68. This step-up feature is determined by the inner and outer diameter of the wheel and shaft, respectively. The only requirement for the frequency step-up is that the diameter of the shaft must be less than the diameter of the wheel opening 74. This principle is explained in a patent to Svenson 2,194,410 and reference is made thereto for a complete understanding of the frequency step-up which is obtained by the subject turbine assembly. It will suffice for present purposes to note that this frequency step-up feature enables the force applier or vibrator employed with this invention to operate up to frequencies of 9,000 cycles per second; this frequency being attained by appropriately dimensioning the shaft 56, turbine wheel 68, fluid passages 66, annular nozzle 64, and exhaust 72.

Therefore, the force applier 30 is so designed that pressurized fluid will drive the turbine wheel 68 at a frequency which is in the range of the mechanical, resonant frequency of the system. The resonant frequency of the generator is determined by the spring rate of the piezoelectric elements sets A, B, C, and the combined mass of the housing of the force applier 30 and the turbine assembly 52; resonance being obtained at that frequency at which mass reactance is equal in dynamic effect to elastic stiffness reactance. This resonance frequency constrains the orbiting turbine wheel to a fixed speed and hence loads and unloads the piezoelectric element sets at a fixed frequency.

As alluded to hereinbefore, the piezoelectric element sets A, B, and C are preloaded by the cap screw 44. This is accomplished by threading the screw into the bore 42 so as to exert a predetermined compressive force on the set A which acts through the force applier to equally distribute this force to the other sets. Assuming, for example, that a preloading of a certain value is applied to the plurality of elements, and the orbiting wheel of the force applier creates a rotating force vector of the same or lower value, then as the force vector acts through the force applier housing to compress or load one of the piezoelectric elements, it simultaneously causes an unloading of one or more of the other elements. A characteristic of the piezoelectric element is that any change of stress therein will cause a voltage, therefore, a voltage is generated not only when the element is compressed but also when the preload is released.

Figure 7:
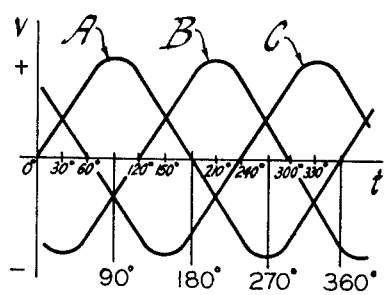
FIGURE 7 is a graphical representation illustrating the phase relationship of voltage vs. time of the embodiment of the invention shown in FIGURE 1.

The above can be understood best by referring to FIGURES 1 and 7 and assuming that the orbiting wheel 68 creates a force vector that is moving from 0° to 360° in a clockwise direction. At 0°, the force vector acts in a direction normal to the axis of set A, with the result that no compressive or unloading force is acting on this set and zero voltage is generated. This same force vector, however, has a force component that is compressing the set C and another force component that is removing the preload from the set B. These force components respectively generate a positive and negative voltage of a value as indicated in the graphical representation of the voltage wave forms shown in FIGURE 7. As the force vector moves from 0° to 90°, the voltage of set A increases to a maximum and the voltage generated by sets B and C are negative and equal because of the equal unloading effect on each. At 180°, a situation similar to that at 0° occurs; however, in this instance set B is subjected to compression while set C is unloading. From 180° to 270°, the preload in the element set A is being removed resulting in the voltage generated by this set being reversed and maximum negative voltage being achieved at 270° due to complete unloading of set A. At the same time, sets B and C are equally compressed and generate positive voltages of equal value. Thus, it is apparent from the above, that maximum positive or negative voltage is generated by each individual set when the force vector is in axial alignment with the set and compressing or unloading it respectively. By angularly separating each set by 120°, the polyphase alternating voltage shown by FIGURE 7 is generated by this device.

It should be understood that various changes and modifications in the subject invention can be made without departing from the spirit of the invention. For example, the number of piezoelectric elements disposed around the force applier can be decreased or increased as to vary the output. Various changes and modifications are contemplated and it should be understood that the invention is limited only by the scope of the appended claims.

What is claimed is:

1. A high frequency polyphase electric generator comprising a housing having an aperture formed therein, a mass-spring system located in said aperture, said system comprising a plurality of piezoelectric elements circumferentially spaced in said aperture, each element having first and second electrical terminals, the first terminal of at least one pair of elements being connected together, the second terminal of each element constituting output terminals of the generator, and a force applier coupled to said elements for sequentially compressing the latter at a frequency in the resonant frequency range of the system whereby a constant high frequency polyphase voltage is developed at said output terminals.

2. A high frequency polyphase electric generator comprising a housing having a circular aperture formed therein, a plurality of piezoelectric elements positioned in said aperture at angularly spaced points of 120°, each element having first and second electrical terminals, the first terminal of at least one pair of elements being connected together, the second terminal of each element constituting output terminals of the generator, a force applier coupled to said elements and adapted to sequentially compress the latter whereby a three-phase voltage is developed at the output terminals.

3. A high frequency electric generator comprising a housing, a mass-spring system located in said housing, said system comprising a plurality of piezoelectric elements circumferentially supported by said housing, each element having first and second electrical terminals, the first terminal of at least one pair of said elements being connected together, the second terminals of each element constituting output terminals of the generator, and a force applier coupled to said elements for sequentially compressing the latter at a frequency in the resonant frequency range of the system whereby a constant high frequency polyphase voltage is developed at the output terminals.

4. A high frequency electric generator comprising a housing having an opening formed therein, a support face formed by said opening in the housing, a plurality of piezoelectric elements having one end thereof mounted in the support face, each element having first and second electrical terminals, the first terminal of at least one pair of elements being connected together, the second terminal of each element constituting output terminals of the generator, a force applier centrally suported in the opening by the other end of the piezoelectric elements, said force applier having a ring type mass supported by a pin, passage means formed in said force applier for directing a stream of pressurized fluid tangentially against the mass so as to cause the mass to orbit around the ring to create a rotating force vector for sequentially compressing the elements whereby a polyphase voltage is developed at the output terminals.

5. The device of claim 4 wherein means are provided for preloading said elements and said rotating force vector sequentially reduces the preloading from said elements.

6. A high frequency electric generator comprising a housing, a mass-spring system located in said housing, said system comprising a plurality of piezoelectric elements supported in said housing, means in said housing for applying a preload to said elements, each element having first and second electrical terminals, the first terminal of at least one pair of elements being connected together, the second terminals of each element constituting output terminals of the generator, and a force applier coupled to said elements for sequentially compressing the elements and removing said preload therefrom at a frequency in the resonant frequency range of the system whereby a constant high frequency polyphase voltage is developed at the output terminals.

7. A high frequency electric generator comprising a housing, a mass-spring system located in said housing, said system comprising a plurality of piezoelectric elements circumferentially supported by said housing, each element having first and second electrical terminals, the first terminal of at least one pair of elements being connected together, the second terminal of each element constituting output terminals of the generator, and a force applier coupled to said elements and supported thereby for sequentially compressing said elements at a frequency in the resonant frequency range of the system whereby a constant high frequency polyphase voltage is developed at the output terminals.

References Cited in the file of this patent
UNITED STATES PATENTS

| | | |
|---|---|---|
| 3,082,333 | Hufferd et al. | Mar. 19, 1963 |
| 3,101,420 | Hufferd et al. | Aug. 20, 1963 |